United States Patent
Omiya et al.

(10) Patent No.: US 6,213,649 B1
(45) Date of Patent: Apr. 10, 2001

(54) SLEEVE FOR OPTICAL CONNECTOR FERRULES AND METHOD FOR PRODUCTION THEREOF

(75) Inventors: Kazuo Omiya, Kurobe; Takeshi Taniguchi; Junichi Nagahora, both of Sendai, all of (JP)

(73) Assignees: YKK Corporation; NTT Advanced Technology Corporation, both of Tokyo (JP)

(*) Notice: Subject to any disclaimer, the term of this patent is extended or adjusted under 35 U.S.C. 154(b) by 0 days.

(21) Appl. No.: 09/075,190

(22) Filed: May 11, 1998

(30) Foreign Application Priority Data

May 12, 1997 (JP) .................................... 9-135756

(51) Int. Cl.$^7$ ................ G02B 6/26; G02B 6/38
(52) U.S. Cl. ............................. 385/60; 385/52
(58) Field of Search .................. 385/60, 52, 66, 385/70, 72, 84

(56) References Cited

U.S. PATENT DOCUMENTS

| | | | |
|---|---|---|---|
| 4,597,632 | * 7/1986 | Mallinson | 385/72 |
| 4,892,379 | * 1/1990 | Takeda et al. | 385/60 |
| 4,989,946 | * 2/1991 | Williams et al. | 385/16 |
| 5,000,537 | * 3/1991 | Saito et al. | 385/55 |
| 5,032,196 | 7/1991 | Masumoto et al. | |
| 5,213,148 | 5/1993 | Matsumoto et al. | |
| 5,239,603 | 8/1993 | Sonoda et al. | |
| 5,359,687 | * 10/1994 | McFarland et al. | 385/52 |

FOREIGN PATENT DOCUMENTS

| | | |
|---|---|---|
| 1448975 | 9/1976 | (GB). |
| 2297626 | 8/1996 | (GB). |
| 6-27348 | 2/1994 | (JP). |

* cited by examiner

Primary Examiner—Jon Henry
(74) Attorney, Agent, or Firm—Finnegan, Henderson, Farabow, Garrett & Dunner, L.L.P.

(57) ABSTRACT

Disclosed are a sleeve for abutting, aligning, and retaining opposed optical connector ferrules and methods for the production thereof. The sleeve has a tubular body provided at three points on the inner wall surface thereof with ridges of an arcuate cross section extending from one to the other end of the tubular body in the longitudinal direction thereof and a slit formed therein in the longitudinal direction thereof. The sleeve is formed of an amorphous alloy possessing at least a glass transition region, preferably a glass transition region of not less than 30 K in temperature width. Preferably the sleeve is formed of an amorphous alloy having a composition represented by the following general formula and containing an amorphous phase in a volumetric ratio of at least 50%:

$$X_a M_b Al_c$$

wherein X represents either or both of two elements, Zr and Hf, M represents at least one element selected from the group consisting of Mn, Fe, Co, Ni, and Cu, and a, b, and c represent such atomic percentages as respectively satisfy $25 \leq a \leq 85$, $5 \leq b \leq 70$, and $0 < c \leq 35$. Such a sleeve can be manufactured with high mass-producibility by a metal mold casting method or molding method.

4 Claims, 5 Drawing Sheets

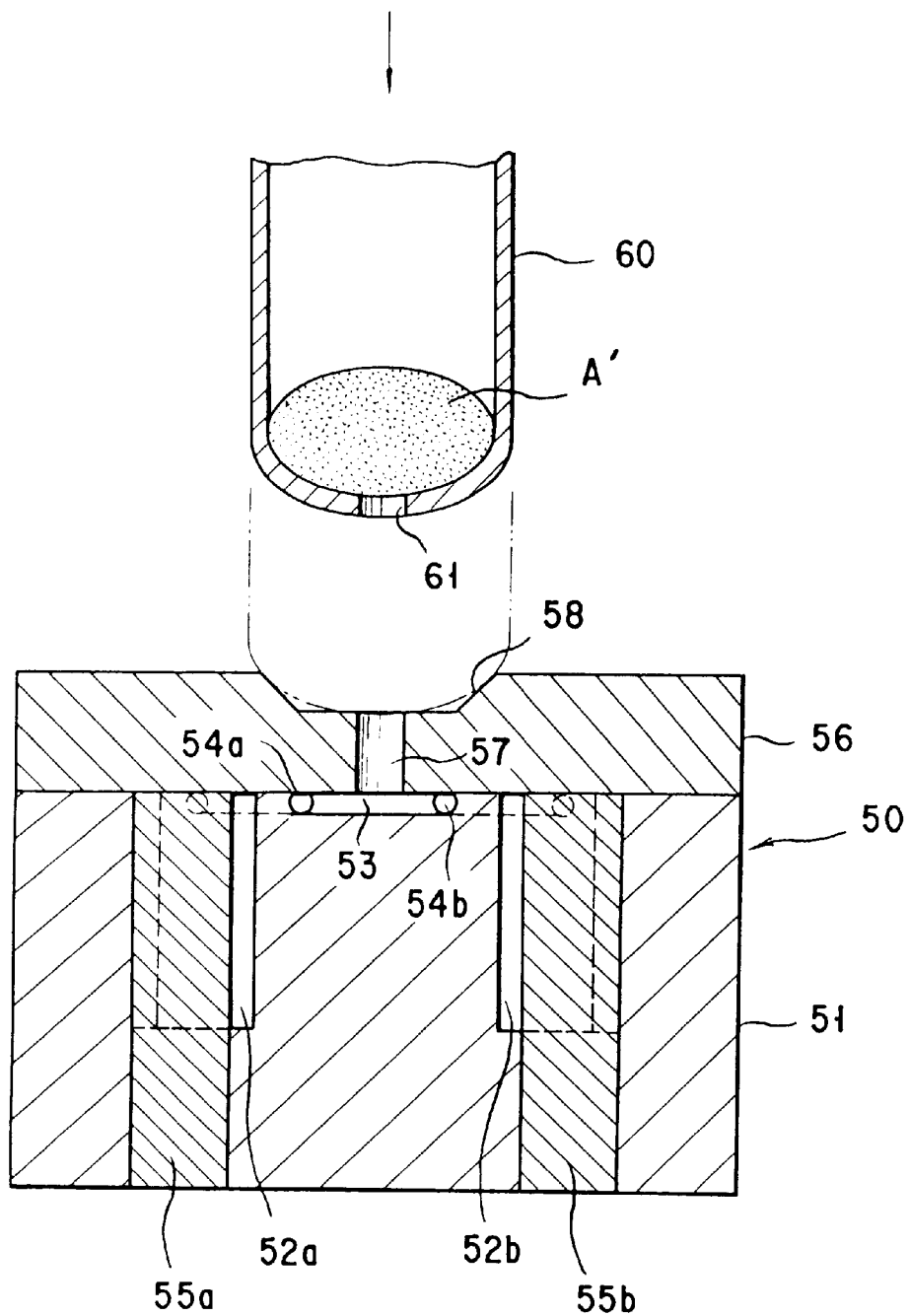

SLEEVE FOR OPTICAL CONNECTOR FERRULES AND METHOD FOR PRODUCTION THEREOF

BACKGROUND OF THE INVENTION

1. Field of the Invention

This invention relates to a sleeve for abutting, aligning, and retaining opposed ferrules for use in an optical connector to be used for connecting optical fibers and a method for the production thereof.

2. Description of the Prior Art

Generally, the connecting part in an optical connector is composed of ferrules having connected thereto a sheathed optical fiber completed by coating the basic thread of an optical fiber with a sheath and a sleeve shaped like a hollow cylinder and adapted to admit opposed ferrules in an aligned state. Particularly unlike the electric connector, the optical connector is required to ensure exact accord between the relative positions of two optical fibers to be connected. It, therefore, becomes necessary to fix an optical fiber in coincidence with the center of a ferrule having the outside diameter thereof and the inside diameter of the part thereof for allowing insertion of the basic thread of an optical fiber finished in respectively specified sizes and then insert a pair of such ferrules into a sleeve through the opposite ends thereof until mutual abutment, and center the axes of the optical fibers. As means for effecting this centering, the methods of the so-called adjusting type which rely on adjusting mechanisms to carry out fine adjustment and the methods of the no-adjusting type which are aimed at heightening the dimensional accuracy of ferrules and sleeves are available. Recently, the methods of the no-adjusting type have been predominating.

Heretofore, most of the ferrules which have been in popular use are those made of such ceramic substances as zirconia. By the same token, the sleeves which are made of such ceramic substances as zirconia have been in popular use.

Published Japanese Patent Application, KOKAI (Early Publication) No. (hereinafter referred to briefly as "JP-A-") 6-27,348, for example, discloses a ceramic sleeve which is formed by providing a tubular body with ridges raised from at least three points on the inner wall surface of the tubular body and extended from one to the other end of the length of the tubular body. The ridge has an upper face formed in a concave circular arc included in a circle centering about the axis of the tubular body, namely a concave arcuate cross section facing the axis of the tubular body. The ridges and the inner wall surface of the tubular body are interconnected with gentle curves. The patent literature mentioned above further discloses a method for the production of the sleeve. This method comprises a step of manufacturing such a ceramic raw material as zirconia or alumina into a tubular body of such a geometric shape as described above, a step of calcining the resultant tubular body, and a step of polishing the upper faces of the ridges on the inner wall surface of the calcined tubular body. When the sleeve is a split type, the method further comprises a step of inserting a slit in the tubular body fresh from the polishing step throughout the entire length thereof in the longitudinal direction.

The ceramic sleeve constructed as described above is generally produced by subjecting the raw material first to primary forming in a cylindrical shape as by powder extrusion or injection molding and then to degreasing and sintering treatments and machining works for grinding the outer surface of the tubular body and abrading the inner wall surface of the tubular body. The process of production, therefore, includes many steps and incurs an enormous cost inevitably. Further, since the raw material is brittle and rigid, the product brings about such problems as shedding chips and leaving the finish of surface polishing at the mercy of the grain size of crystals. Since the ceramic sleeve is rigid and deficient in elasticity, the ridges raised from the inner wall surface of the sleeve tend to inflict scratches on the outer faces of the ferrules and the sleeve and the ferrules, on repeating their mutual attachment and detachment, tend to backlash possibly to the extent of inducing a deviation from the axial alignment of the optical fibers. The ceramic substance, therefore, is not perfectly fit as a material for the sleeve in the optical connector which is prone to frequent attachment and detachment of the ferrules.

Further, since the ceramic sleeve inevitably contracts when it is sintered subsequently to the primary formation, it must be ground to prescribe dimensions by all means. When the ridges are formed as extended in the longitudinal direction on the inner wall surface of the tubular body, therefore, the upper faces of the ridges are ground in a concave arcuate shape along the axis of the tubular body as disclosed in JP-A-6-27,348 mentioned above. When these ridges are formed at three points on the inner wall surface of the tubular body, it is not the concave arcuate faces of the ridges but the opposite lateral edges of these faces in the longitudinal direction that are actually exposed to contact with the outer peripheral surfaces of the ferrules which have been inserted into the sleeve. When the component ridges of the sleeve are exactly in agreement in size, therefore, the sleeve is fated to fix the ferrules in position in a state such that the opposite lateral edges (located at a total of six points) are held in contact with the outer surfaces of the ferrules. When the ridges involve a dimensional error, even if slightly, the contact occurs only at part of the points mentioned above. As a consequence, the possibility arises that the ridges will give rise to a deviation in contact and fixation at the points mentioned above in relation to the ferrules inserted into the sleeve opposite each other and the terminals of the optical fibers being connected consequently will inevitably deviate from their mutual axial alignment.

SUMMARY OF THE INVENTION

It is, therefore, an object of the present invention to provide a sleeve for optical connector ferrules which is capable of accurately abutting, aligning, and retaining opposed optical connector ferrules while incurring only sparingly such problems mentioned above as causing a deviation from axial alignment of the connected optical fibers and suffering the sleeves to shed chips.

A further object of the present invention to provide a method which, owing to the combination of a technique based on the conventional metal mold casting process or molding process with the quality of an amorphous alloy exhibiting a glass transition region, allows a sleeve for optical connector ferrules satisfying a predetermined shape, dimensional accuracy, and surface quality to be mass-produced with high efficiency by a simple process and, therefore, enables to omit or diminish markedly such machining steps as grinding and consequently provide an inexpensive sleeve for optical connector ferrules excelling in durability, strength, resistance to impact, and elasticity expected of the sleeve.

To accomplish the object mentioned above, the first aspect of the present invention provides a sleeve for abutting, aligning, and retaining opposed optical connector ferrules, which sleeve is characterized by being manufactured from an amorphous alloy instead of a ceramic material or metallic material which has been heretofore used.

The first embodiment of the sleeve for optical connector ferrules according to the present invention is characterized by being manufactured from an amorphous alloy possessing at least a glass transition region, preferably a glass transition region of a temperature width of not less than 30 K. In a preferred embodiment, the sleeve is characterized by being formed of a substantially amorphous alloy having a composition represented by the following general formula and containing an amorphous phase in a volumetric ratio of at least 50%:

$$X_a M_b Al_c$$

wherein X represents either or both of the two elements, Zr and Hf, M represents at least one element selected from the group consisting of Mn, Fe, Co, Ni, and Cu, and a, b, and c represent such atomic percentages as respectively satisfy $25 \leq a \leq 85$, $5 \leq b \leq 70$, and $0 < c \leq 35$.

The second embodiment of the sleeve according to the present invention, in view of the ease with which the optical connector ferrules and the sleeve used for abutting, aligning, and retaining the terminals of the ferrules succumb to deformation, is characterized by being manufactured from an amorphous alloy more susceptible of elastic deformation than the material for the optical connector ferrules lest the repetition of attachment and detachment of the sleeve and the ferrules should inflict injury on the ferrules or compel the ferrules to develop backlash.

The second aspect of the present invention, to give a sleeve a geometric shape fit for the purpose of abutting, aligning, and retaining opposed optical connector ferrules and to prevent the ferrules from being injured, consists in providing a sleeve characterized by having a tubular body provided at three points on the inner wall surface thereof with ridges extending from one to the other end of the tubular body in the longitudinal direction thereof, the ridges being so formed that the upper faces thereof may have an arcuate cross section which curves toward the axis of the tubular body.

The sleeve according to a preferred embodiment of the present invention is characterized by the fact that the tubular body mentioned above is provided throughout the entire length in the longitudinal direction thereof with such a slit as enables the optical connector ferrules to be elastically retained and preclude the occurrence of backlash even when the attachment and detachment of the sleeve and the ferrules are repeated.

Another aspect of the present invention consists in providing methods for the production of the sleeve for use with optical connector ferrules as mentioned above.

One mode of the methods is characterized by comprising the steps of melting an alloying material capable of producing an amorphous alloy in a melting vessel having an upper open end, forcibly transferring the resultant molten alloy into a forced cooling casting mold disposed above the vessel and provided with at least one molding cavity, and rapidly solidifying the molten alloy in the forced cooling casting mold to confer amorphousness on the alloy thereby obtaining the product made of an alloy containing an amorphous phase.

In a preferred embodiment of this method, the melting vessel is furnished therein with a molten metal transferring member adapted to forcibly transfer the molten alloy upward, the forced cooling casting mold is provided with at least two identically shaped molding cavities and runners severally communicating with the cavities, and the runners are disposed on an extended line of a transfer line for the molten metal transferring member.

Another method is characterized by comprising the steps of providing a vessel for melting and retaining an alloying material capable of producing an amorphous alloy possessing a glass transition region, providing a metal mold provided with at least one cavity of the shape of the product aimed at, coupling a hole formed in, for example, the lower or upper part of the vessel with a sprue of the metal mold, for example by disposing the metal mold beneath or on the vessel, applying pressure on a melt of the alloy in the vessel thereby enabling a prescribed amount of the melt to pass through the hole of the vessel and fill the cavity of the metal mold, and solidifying the melt in the metal mold at a cooling rate of not less than 10 K(Kelvin scale)/sec. thereby giving rise to the product of an alloy containing an amorphous phase.

In any of the methods described above, as the alloying material mentioned above, a material capable of producing a substantially amorphous alloy having a composition represented by the aforementioned general formula: $X_a M_b Al_c$, and containing an amorphous phase in a volumetric ratio of at least 50% is advantageously used.

Still another method of the present invention is characterized by comprising the steps of heating an amorphous material formed of the alloy represented by the general formula mentioned above until the temperature of a supercooled liquid region, inserting the resultant hot amorphous material into a container held at the same temperature, coupling with the container a metal mold provided with a cavity of the shape of the product aimed at, and forcing a prescribed amount of the alloy in the state of a supercooled liquid into the metal mold by virtue of the viscous flow thereof.

BRIEF DESCRIPTION OF THE DRAWINGS

Other objects, features, and advantages of the invention will become apparent from the following description taken together with the drawings, in which:

FIG. 8 is a fragmentary cross-sectional view schematically illustrating another embodiment of the apparatus to be used for the production of the sleeve of the present invention.

DETAILED DESCRIPTION OF THE INVENTION

Figure 1:
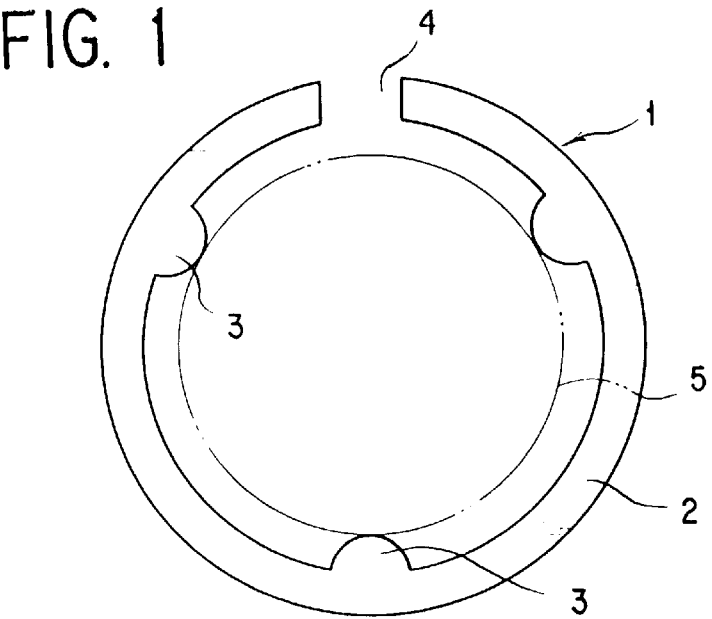
FIG. 1 is a plan view illustrating one embodiment of the sleeve of the present invention.

According to one aspect of the present invention, the sleeve which abuts, aligns, and retains the opposed optical connector ferrules as described above is manufactured from an amorphous alloy. The amorphous alloy manifests low hardness and high elasticity as compared with a ceramic material, exhibits high tensile strength and high bending strength, and excels in durability, impact resistance, surface smoothness, etc. and, therefore, constitutes itself the optimum material for the sleeve which abuts the opposed optical connector ferrules, aligns them without involving any deviation from axial alignment, and infallibly retains them. The sleeve which has been manufactured from the amorphous alloy possessed of such characteristic properties as described above is such that the ridges of a semicircular cross section, for example, to be formed on the inner wall surface thereof, therefore, do not easily injure the outer surfaces of the ferrules or do not easily develop backlash after the repetition of the attachment and detachment of the ferrules to and from the sleeve but allow stable connection between the opposed ferrules.

Further, the amorphous alloy possesses highly accurate castability and machinability and, therefore, allows manufacture of a sleeve of smooth surface faithfully reproducing the contour of the cavity of the mold by the metal mold casting method or molding method. The sleeve made of a ceramic material must be ground to a prescribed size by all means after the step of sintering because this sleeve, on being sintered subsequently to primary formation, yields to contraction as described above. In sharp contrast, the sleeve made of an amorphous alloy permits omission of a step for adjustment of size or adjustment of surface coarseness or allows copious curtailment of such a step because this sleeve obviates the necessity for a sintering step and consequently precludes the possibility of the produced sleeve from sustaining contraction due to sintering. The sleeve which satisfies dimensional prescription, dimensional accuracy, and surface quality, therefore, can be manufactured by a single process with high mass producibility.

The material for the sleeve of the present invention does not need to be limited to any particular substance but may be any of the materials which are capable at all of furnishing a product formed substantially of amorphous alloy. Among other materials answering this description, the Zr-TM-Al and Hf-TM-Al (TM: transition metal) amorphous alloys having very wide differences between the glass transition temperature (Tg) and the crystallization temperature (Tx) exhibit high strength and high corrosion resistance, possess wide supercooled liquid ranges (glass transition ranges), $\Delta Tx=Tx-Tg$, of not less than 30 K, and extremely wide supercooled liquid ranges of not less than 60 K in the case of the Zr-TM-Al amorphous alloys. In the above temperature ranges, these amorphous alloys manifest very satisfactory workability owing to viscous flow even at such low stress not more than some tens MPa. They are characterized by being produced easily and very stably as evinced by the fact that they are enabled to furnish an amorphous bulk material even by a casting method using a cooling rate of the order of some tens K/s. The aforementioned Zr-TM-Al and Hf-TM-Al amorphous alloys are disclosed in U.S. Pat. No. 5,032,196 issued Jul. 16, 1991 to Masumoto et al., the teachings of which are hereby incorporated by reference. After a further study in search of uses for these alloys, the inventor has ascertained that by the metal mold casting from melt and by the molding process utilizing the viscous flow resorting to the glass transition range as well, these alloys produce amorphous materials and permit very faithful reproduction of the shape and size of a molding cavity of a metal mold and, with the physical properties of the alloys as a contributory factor, befit the optical connector ferrules and the sleeve for connecting them.

The Zr-TM-Al and Hf-TM-Al amorphous alloys to be used in the present invention possess very large range of $\Delta Tx$, though variable with the composition of alloy and the method of determination. The $Zr_{60}Al_{15}Co_{25}Ni_7Cu_{15}$ alloy (Tg: 652K, Tx: 768K), for example, has such an extremely wide $\Delta Tx$ as 116 K. It also offers very satisfactory resistance to oxidation such that it is hardly oxidized even when it is heated in the air up to the high temperature of Tg. The Vickers hardness (Hv) of this alloy at temperatures from room temperature through the neighborhood of Tg is 460 (DPN), the tensile strength thereof is 1,600 MPa, and the bending strength thereof is up to 3,000 MPa. The thermal expansion coefficient, $\alpha$ of this alloy from room temperature through the neighborhood of Tg is as small as $1\times10^{-5}$ /K, the Young's modulus thereof is 91 GPa, and the elastic limit thereof in a compressed state exceeds 4–5%. Further, the toughness of the alloy is high such that the Charpy impact value falls in the range of 6–7 $J/cm^2$. This alloy, while exhibiting such properties of very high strength as mentioned above, has the flow stress thereof lowered to the neighborhood of 10 MPa when it is heated up to the glass transition range thereof. This alloy, therefore, is characterized by being worked very easily and being manufactured with low stress into minute parts and high-precision parts complicated in shape. Moreover, owing to the properties of the so-called glass (amorphous) substance, this alloy is characterized by allowing manufacture of formed (deformed) articles with surfaces of extremely high smoothness and having substantially no possibility of forming a step which would arise when a slip band appeared on the surface as during the deformation of a crystalline alloy.

Generally, an amorphous alloy begins to crystallize when it is heated to the glass transition range thereof and retained therein for a long time. In contrast, the aforementioned alloys which possess such a wide $\Delta Tx$ range as mentioned above enjoy a stable amorphous phase and, when kept at a temperature properly selected in the $\Delta Tx$ range, avoid producing any crystal for a duration up to about two hours. The user of these alloys, therefore, does not need to feel any anxiety about the occurrence of crystallization during the standard molding process.

The aforementioned alloys manifest these properties unreservedly during the course of transformation thereof from the molten state to the solid state. Generally, the manufacture of an amorphous alloy requires rapid cooling. In contrast, the aforementioned alloys allow easy production of a bulk material of a single amorphous phase from a melt by the cooling which is effected at a rate of about 10 K/s. The solid bulk material consequently formed also has a very smooth surface. The alloys have transferability such that even a scratch of the order of microns inflicted by the polishing work on the surface of a metal mold is faithfully reproduced.

When the aforementioned alloys are adopted as the alloying material for the sleeve, therefore, the metal mold to be used for producing the formed article is only required to have the surface thereof adjusted to fulfill the surface quality expected of the sleeve because the molded product faithfully reproduces the surface quality of the metal mold. In the conventional metal mold casting method or molding method, therefore, these alloys allow the steps for adjusting the size and the surface roughness of the molded article to be omitted or diminished.

The characteristics of the aforementioned amorphous alloys including in combination relatively low hardness, high tensile strength, high bending strength, relatively low Young's modulus, high elastic limit, high impact resistance, smoothness of surface, and highly accurate castability or workability render these alloys appropriate for use as the material for the sleeve for the optical connector ferrules. They even allow these alloys to be molded for mass production by the conventional molding method.

The amorphous alloys represented by the general formula, $X_aM_bAl_c$, mentioned above manifest the same characteristics as mentioned above even when they incorporate such elements as Ti, C, B, Ge, or Bi at a ratio of not more than 5 atomic %.

The advantages derived from adopting these alloys for the sleeve will be described more specifically below.

The first advantage resides in allowing mass-production of formed articles of high accuracy. The inside diameter of the sleeve which directly retains an optical connector ferrules or the diameter of a circle which passes the points of contact with the ferrule at the upper ends of the ridges thereof is required to approximate as closely to the outside diameter of the ferrule as possible. The formed article heretofore obtained by injecting, degreasing, and sintering a ceramic material fails to satisfy the dimensional accuracy and the surface quality of a sleeve. It has been customary, therefore, to produce a molded article in a size allowing for machining and then finish it by complicated polishing treatments including abrasive finishing of the inside diameter by wire lapping using a diamond abrasive paste and abrasive finishing of the outside diameter. In the present invention, the use of a properly prepared metal mold in the casting and in the viscous flow forming (glass shaping) as well allows the formed tarticles to be mass-produced without requiring a finish polishing or with a supplementary simple finish treatment. The method of the present invention is highly effective in producing sleeves satisfactory in terms of the roundness of the through-hole and the finish of the inner surface of the hole. The lengthy process of manufacture using a ceramic material, therefore, can be curtailed in a great measure.

The second advantage consists in such mechanical properties of the sleeve as strength and toughness. Since the optical connector ferrules are frequently attached to and detached from the sleeve repeatedly, the sleeve must not settle, abrade, or crack. The hardness, strength, and toughness of the alloy mentioned above are enough to preclude the defects mentioned above.

According to the present invention, as described above, the sleeves satisfying the dimensional accuracy and the surface quality required of the sleeves for optical connector ferrules can be manufactured with high productivity at a low cost by the metal mold casting method or molding method using the amorphous alloys having a wide glass transition region such as the Zr-TM-Al and Hf-TM-Al amorphous alloys. Further, since the amorphous alloy to be used for the present invention excels in strength, toughness, and resistance to corrosion, the sleeves manufactured from this amorphous alloy withstand long service without readily sustaining abrasion, deformation, chipping, or other similar defects.

The amorphous alloy possessed of the characteristics mentioned above can be advantageously utilized for the ferrule and other component parts of the optical connector and for the precision parts for micromachines as well as for the sleeve.

In still another embodiment of the present invention, the sleeve is manufactured from an amorphous alloy more susceptible of elastic deformation than the material of the optical connector ferrules, namely an amorphous alloy having Young's modulus lower than that of the ferrule by about 3–30 GPa, preferably 5–15 GPa. Owing to this specific choice of material, the sleeve allows opposed ferrules to be stably retained easily in a state aligning the axes thereof without the possibility of suffering the ferrules to sustain injury or develop backlash even when the ferrules are repeatedly attached to and detached from the sleeve.

As the material for ferrules to be used, ceramics and metals may be used. Among other materials, an amorphous alloy, particularly the amorphous alloy having a composition represented by the aforementioned general formula: $X_aM_bAl_c$, and containing an amorphous phase in a volumetric ratio of at least 50% proves to be particularly desirable in terms of the mechanical properties, castability, and workability thereof as mentioned above. By the use of such an amorphous alloy, ferrules can be mass-produced by the metal mold casting method or molding method (glass shaping) without requiring a finish polishing or with a supplementary simple finish treatment. The use of the amorphous alloy is highly effective in producing ferrules satisfactory in terms of the roundness of the cross section of the minute fiber-insertion hole and the finish of the inner surface of the hole. The PC polishing which is usually performed on the leading end of a ferrule to impart the spherical convex surface thereto for the purpose of ensuring intimate contact of glass fibers is no longer necessary. It suffices to perform the final polish after the optical fiber has been set in position. The lengthy process of manufacture using a metallic material and a ceramic material, therefore, can be curtailed in a great measure. The same remarks hold good for the outside diameter of the ferrule and the coincidence between the axis of the outside diameter and the axis of the minute fiber-insertion hole of the ferrule.

In the second aspect of the present invention, the sleeve is vested with such a geometric shape as fits the purpose of retaining the opposed ferrules as aligned mutually to the axes thereof without inflicting injury on the ferrules.

Now, the shape of the sleeve of the present invention will be described below with reference to the drawings annexed hereto.

Figure 2:
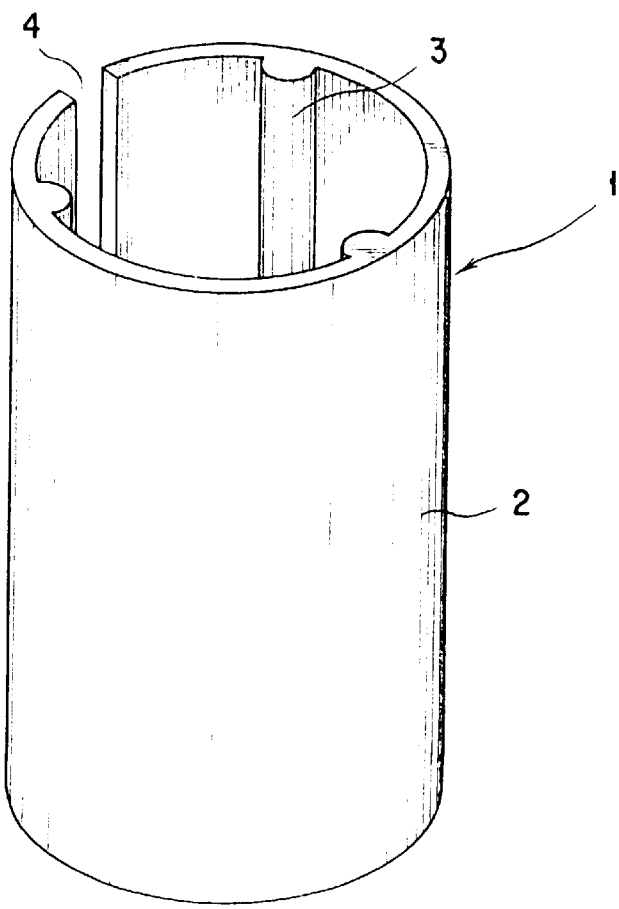
FIG. 2 is a perspective view of the sleeve shown in FIG. 1.

FIG. 1 and FIG. 2 illustrate one preferred mode of embodying the sleeve of the present invention; FIG. 1 is a plan view of the sleeve and FIG. 2 a perspective view thereof.

This sleeve 1 comprises a tubular body 2, ridges (elongate elevations) 3 raised from the inner wall surface of the tubular body 2 at three points as extended from one to the other end thereof in the longitudinal direction, and a slit 4 formed in the wall of the tubular body 2 throughout the entire length in the longitudinal direction thereof.

The ridges 3, for the purpose of avoiding infliction of injury on the ferrules, are required to have an arcuate upper face convex toward the axis of the tubular body 2 and a cross section such as, for example, a substantially semicircular cross section, a substantially semielliptic cross section, a triangular cross section containing a rounded upper end, etc. Preferably, the ridges 3 assume such a substantially semicircular cross section as is illustrated in FIG. 1. By having the ridges 3 of this description provided on the inner wall surface of the tubular body 2 at three points as extended in the longitudinal direction, the sleeve 1 is enabled to retain the ferrules therein in a state nipped at three points of the ridges contacting the outer wall surfaces of the ferrules. As a result, the sleeve 1 is capable of stably retaining the abutted ferrules as mutually aligned to the axes of the ferrules (and consequently of the optical fibers being connected) without inflicting injury on the ferrules. When the ridges have an acute upper end for the sake of the point contact mentioned above, they are at a disadvantage in suffering the upper ends to concentrate the load exerted thereon and tend to inflict injury on the outer surfaces of the ferrules. When the ridges are provided at four or more points on the inner wall surface of the sleeve, they tend to cause deviation in the points of contact and fixation of the opposed ferrules inserted in the sleeve and tend to disrupt the coincidence of the axes of the optical fibers being connected.

The ridges are preferred to be disposed as equally spaced at three points on the inner wall surface of the tubular body 2, though a slight deviation in the regular spacing is tolerable. Though the height of the ridges 3 has only to satisfy the requirement that the ridges 3 be capable of stably retaining the ferrules, it is generally preferred to be in the range of about 0.1–1.0 mm (about 0.1–1.0 mm in radius in the case of the ridges having a semicircular cross section). While the ridges 3 are preferred to be a continued elevation, they may discontinuously extend throughout the entire length of the tubular body as occasion demands.

The sleeve 1, as described above, has the slit 4 formed in the wall thereof throughout the entire length in the longitudinal direction. Even with a precision sleeve which is not furnished with this slit, the present invention attains the aforementioned effect due to the use of such an amorphous alloy as the material as mentioned above and the effect due to the formation of the ridges mentioned above. The provision of the slit 4, however, is advantageous in enhancing the elasticity of the sleeve 1, enabling the sleeve to nip stably the opposed ferrules elastically as aligned mutually to their axes even in the presence of more or less dispersion of dimensional accuracy, and permitting the ferrules to be repeatedly attached to and detached from the sleeve without rendering the development of backlash in the state of retention of ferrules.

As respects the mechanical properties of the material itself for the sleeve 1, the sleeve 1 is preferred to manifest a Young's modulus in the approximate range of 90–99 GPa and an elastic limit in the approximate range of 1% to several %. The sleeve of the present invention is manufactured from an amorphous alloy, a material sharply contrasted to the ceramic material of the conventional sleeve such as, for example, zirconia which is nearly devoid of elasticity. This sleeve, therefore, excels in elastic properties such that it fully tolerates the repeated attachment and detachment of ferrules.

Figure 3:
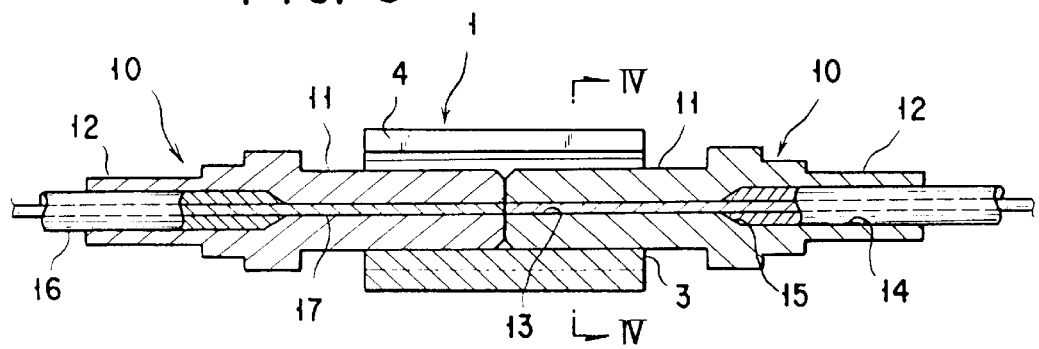
FIG. 3 is a fragmentary cross-sectional view illustrating one mode of the use of the sleeve of the present invention.
Figure 4:
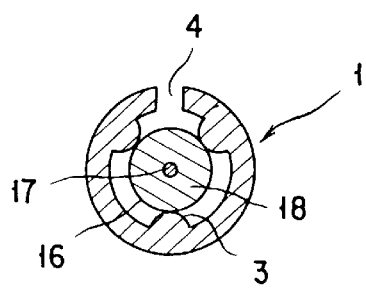
FIG. 4 is a cross section taken through FIG. 3 along the line IV—IV.

FIG. 3 and FIG. 4 illustrate one mode of the use of the sleeve 1 of the present invention in optical connectors. The sleeve 1 presumes use of ferrules 10 each of a one-piece construction comprising a capillary part 11 and a flange part 12.

Specifically, this ferrule 10 is composed of the capillary part 11 which has formed along the axis thereof a through-hole 13 of a small diameter intended for the insertion of an optical fiber 17 (or the basic thread of an optical fiber coated with a plastic thin film) and the flange part 12 which has formed along the axis thereof a through-hole 14 of a large diameter intended for the insertion of a sheathed optical fiber 16 (the optical fiber coated with a sheath 18). The through-hole 13 of the small diameter and the through-hole 14 of the large diameter are connected into each other through a tapered part 15.

The attachment of the optical fiber to the ferrule 10 of this construction is fulfilled by stripping the leading end part of the sheathed optical fiber 16 of the sheath 18 to expose the optical fiber 17 in a prescribed length, applying an adhesive agent to the exposed optical fiber and the leading end part of the sheathed optical fiber, inserting the exposed optical fiber 17 into the through-hole 13 of the small diameter in the ferrule 10 from the flange part side thereof, and allowing the leading end parts of the optical fiber 17 and the sheathed optical fiber 16 to be immobilized with the adhesive agent in the through-holes 13a nd 14 of the ferrule 10.

The connection of a pair of optical fibers 17, 17 is attained by inserting into the sleeve 1 through the opposite ends thereof the ferrules 10, 10 having the optical fibers already inserted and joined therein and then abutting the end parts of the ferrules 10, 10. As a result, the optical fibers 17, 17 are allowed to have their leading end parts abutted and joined in a state having the axes thereof aligned to each other.

The circle 5 (FIG. 1) which passes the upper ends of the ridges 3 at the three points of the sleeve 1 has a diameter slightly smaller than the outside diameter of the capillary part 11 of the ferrule 10. When the ferrules 10, 10 are inserted into the sleeve 1 through the opposite ends thereof, therefore, the sleeve 1 is slightly pushed open and ultimately enabled to retain the capillary parts 11, 11 in an elastically nipped state.

Figure 5:
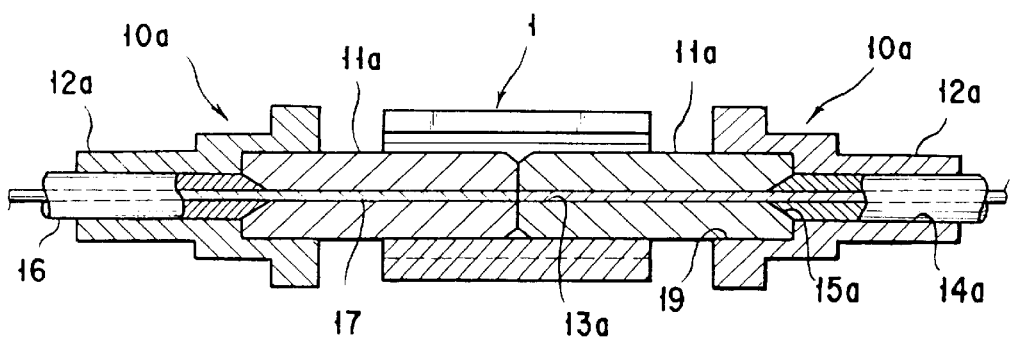
FIG. 5 is a fragmentary cross-sectional view illustrating another mode of the use of the sleeve of the present invention.

FIG. 5 illustrates another mode of using the sleeve 1 of the present invention in optical connectors. A ferrule 10a uses a capillary part 11a and a flange part 12a as separate components.

Specifically, this ferrule 10a is composed of the capillary 11a which has formed along the axis thereof a through-hole 13a of a small diameter intended for the insertion of the optical fiber 17 and the flange 12a which has formed along the axis thereof a through-hole 14a of a large diameter for the insertion of the sheathed optical fiber 16. It is assembled by fixing the end part of the capillary 11a enclosing a tapered hole 15a therein in an leading end hole part 19 of the flange 12a by virtue of tight fit or adhesion. The through-hole 13a of the small diameter in the capillary 11a and the through-hole 14a of the large diameter in the flange 12a are joined through the medium of a tapered hole part 15a.

The method for joining the optical fiber to the ferrule 10a and the mode of attachment of the sleeve 1 and the ferrules 10a, 10a are the same as those of the embodiment illustrated in FIG. 3 and FIG. 4.

Figure 6:
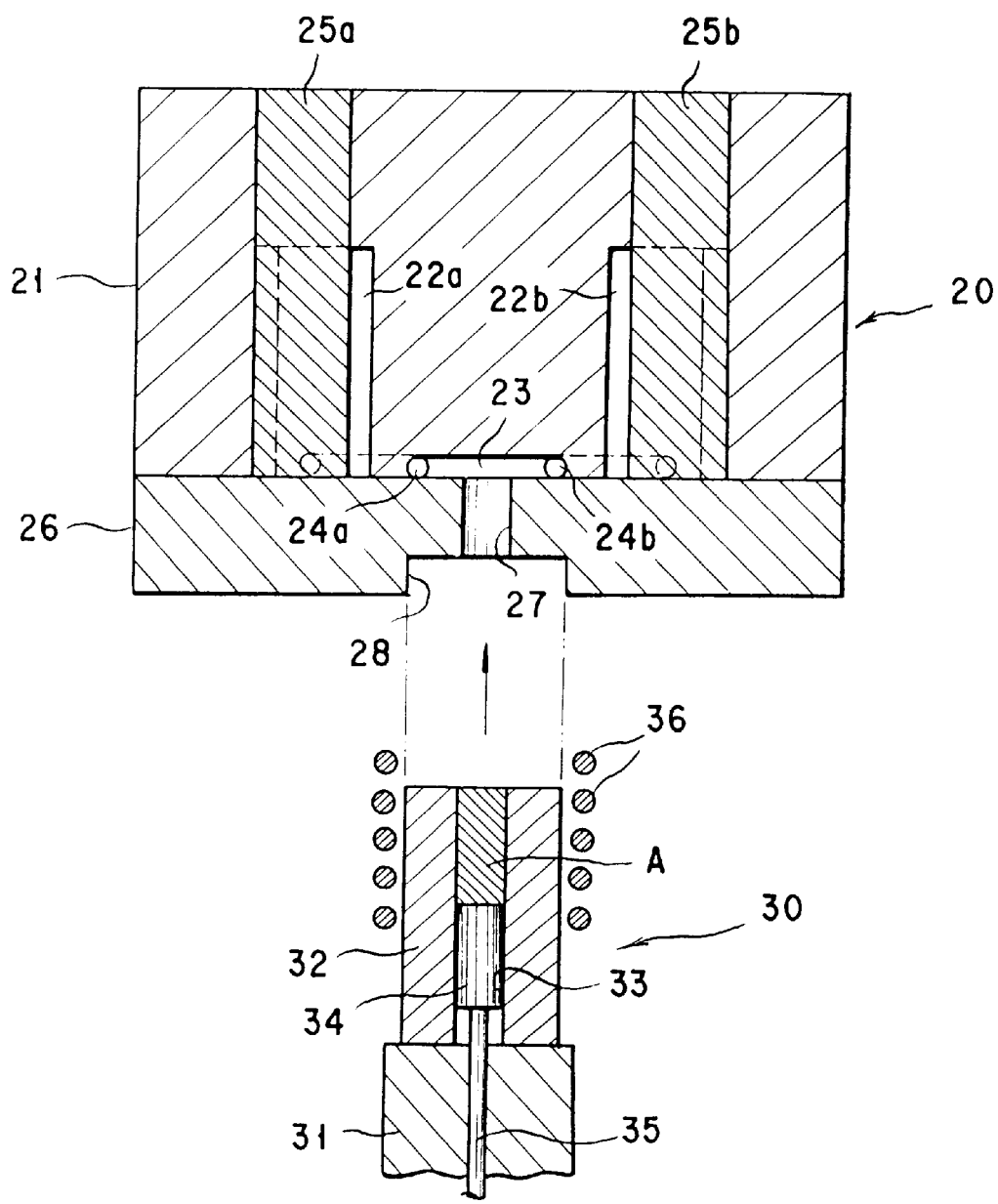
FIG. 6 is a fragmentary cross-sectional view schematically illustrating one embodiment of the apparatus to be used for the production of the sleeve of the present invention.

FIG. 6 schematically illustrates one mode of embodying an apparatus and method for the production of the sleeve of the present invention by the metal mold casting technique.

A forced cooling casting mold 20 is a split mold composed of an upper mold 21 and a lower mold 26. The upper mold 21 has a pair of molding cavities 22a, 22b formed therein and adapted to define the outside dimension of a sleeve. Inside these cavities 22a, 22b, cores 25a, 25b for defining the inside dimension of the sleeve are formed respectively. These cavities 22a, 22b intercommunicate through the medium of a runner 23 such that the molten metal flows through the leading ends of such parts 24a, 24b of the runner as half encircle the peripheries of the cavities 22a, 22b at a prescribed distance into the cavities 22a, 22b. On the other hand, a sprue (through-hole) 27 communicating with the runner 23 mentioned above is formed at a pertinent position of the lower mold 26. Underneath the sprue 27 is formed a depression 28 which is shaped to conform with a cylindrical raw material accommodating part or pot 32 constituting itself an upper part of a melting vessel 30.

The cores 25a, 25b, when necessary, may be formed integrally with the lower mold 26. While the forced cooling casting mold 20 can be made of such metallic material as copper, copper alloy, cemented carbide or superalloy, it is preferred to be made of such material as copper or copper alloy which has a large thermal capacity and high thermal conductivity for the purpose of heightening the cooling rate of the molten alloy poured into the cavities 22a, 22b. The upper mold 21 may have disposed therein such a flow channel as allow flow of a cooling medium like cooling water or cooling gas.

The melting vessel 30 is provided in the upper part of a main body 31 thereof with the cylindrical raw material accommodating part 32 and is disposed directly below the sprue 27 of the lower mold 26 in such a manner as to be reciprocated vertically. In a raw material accommodating hole 33 of the raw material accommodating part 32, a molten metal transferring member or piston 34 having nearly the same diameter as the raw material accommodating hole 33 is slidably disposed. The molten metal transferring member 34 is vertically moved by a plunger 35 of a hydraulic cylinder (or pneumatic cylinder) not shown in the diagram. An induction coil 36 as a heat source is disposed so as to encircle the raw material accommodating part 32 of the melting vessel 30. As the heat source, any arbitrary means such as one resorting to the phenomenon of resistance heating may be adopted besides the high-frequency induction heating. The material of the raw material accommodating part 32 and that of the molten metal transferring member 34 are preferred to be such heat-resistant material as ceramics or metallic materials coated with a heat-resistant film.

Incidentally, for the purpose of preventing the molten alloy from forming an oxide film, it is preferred to dispose the apparatus in its entirety in a vacuum or an atmosphere of an inert gas such as Ar gas or establish a stream of an inert gas at least between the lower mold 26 and the upper part of the raw material accommodating part 32 of the melting vessel 30.

The production of the sleeve of the present invention is effected by first setting the melting vessel 30 in a state separated downwardly from the forced cooling casting mold 20 and then charging the empty space overlying the molten metal transferring member 34 inside the raw material accommodating part 32 with the alloying raw material A of a composition capable of yielding such an amorphous alloy as mentioned above. The alloying raw material A to be used may be in any of the popular forms such as rods, pellets, and minute particles.

Subsequently, the induction coil 36 is excited to heat the alloying raw material A rapidly. After the fusion of the alloying raw material A has been confirmed by detecting the temperature of the molten metal, the induction coil 36 is demagnetized and the melting vessel 30 is elevated until the upper end thereof is inserted in the depression 28 of the lower mold 26. Then, the hydraulic cylinder is actuated to effect rapid elevation of the molten metal transferring member 34 through the medium of the plunger 35 and injection of the molten metal through the sprue 27 of the casting mold 20. The injected molten metal is advanced through the runner 23, 24a, 24b, introduced into the cavities 22a, 22b and compressed and rapidly solidified therein. In this case, the cooling rate exceeding $10^3$ K/s can be obtained by suitably setting such factors as injection temperature and injection speed, for example. Thereafter, the melting vessel 30 is lowered and the upper mold 21 and the lower mold 26 are separated to allow extraction of the product.

Figure 7:
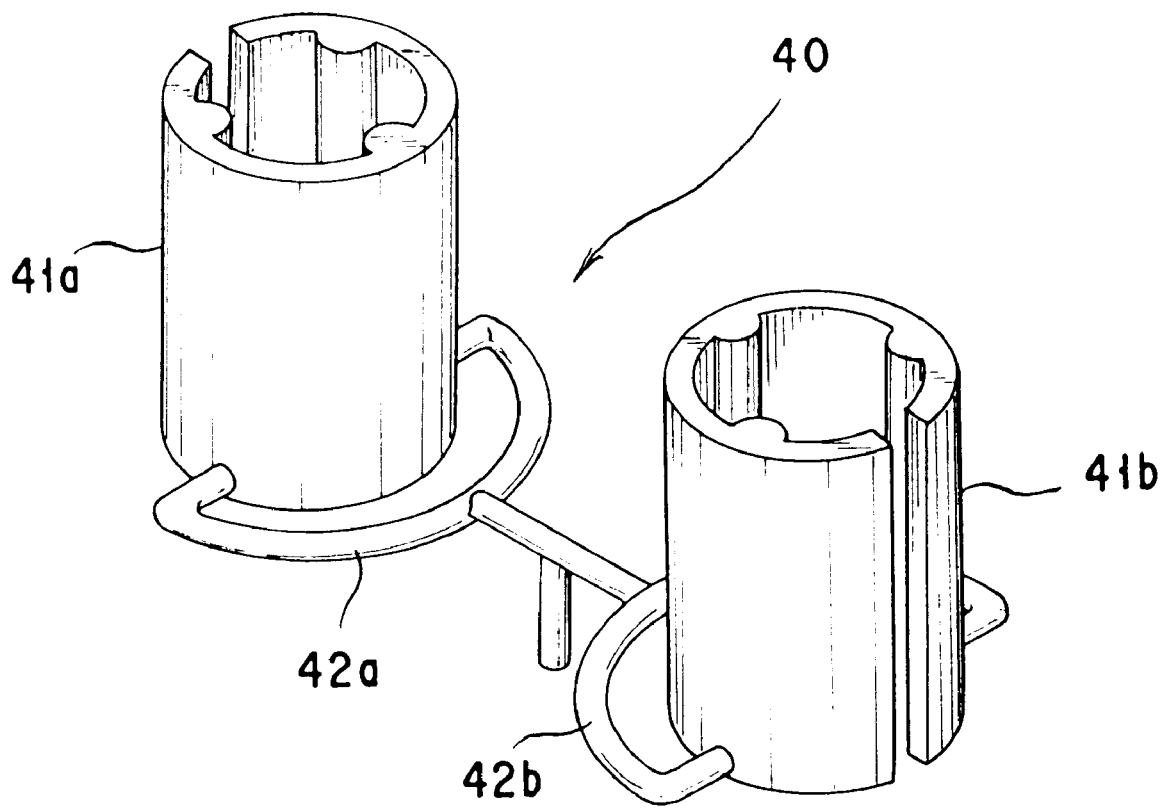
FIG. 7 is a perspective view of a cast article manufactured by the apparatus shown in FIG. 6.

The shape of the cast product manufactured by the method described above is illustrated in FIG. 7. The sleeves 1 possessed of a smooth surface faithfully reproducing the cavity surface of the casting mold as illustrated in FIG. 1 and FIG. 2 are obtained by severing runner parts 42a, 42b from sleeve parts 41a, 41b of a cast product 40 and grinding the cut faces of the sleeve parts remaining after by the severance.

The high-pressure die casting method described above allows a casting pressure up to about 100 MPa and an injection speed up to about several m/s and enjoys the following advantages.

(1) The charging of the mold with the molten metal completes within several milliseconds and this quick charging adds greatly to the action of rapid cooling.

(2) The highly close contact of the molten metal to the mold adds to the speed of cooling and allows precision molding of molten metal as well.

(3) Such faults as shrinkage cavities possibly occurring during the shrinkage of a cast article due to solidification can be allayed.

(4) The method allows manufacture of a formed article in a complicated shape.

(5) The method permits smooth casting of a highly viscous molten metal.

FIG. 8 illustrates schematically the construction of another mode of embodying the apparatus and method for producing the sleeve of the present invention.

In FIG. 8, the reference numeral 60 denotes a vessel for melting an alloying material capable of producing such an amorphous alloy as mentioned above and holding the produced melt therein. Beneath this vessel 60 is disposed a split metal mold 50 having cavities 52a, 52b of the shape of a product aimed at. Any of such known heating means (not shown) as, for example, the high-frequency induction heating and the resistance heating may be adopted for heating the vessel 60.

The construction of the metal mold 50 is substantially identical with the mold 20 illustrated in FIG. 6 mentioned above except that the vertical positional relation is reversed. Specifically, an upper mold 56 has formed in the upper part of a sprue (through-hole) 57 a depression 58 for accommodating the lower end part of the vessel 60 and corresponds to the lower mold 26 shown in FIG. 6. Meanwhile, a lower mold 51 is identical with the upper mold 21 shown in FIG. 6 except that molding cavities 52a, 52b, runners 53, 54a, 54b, and cores 55a, 55b have their shapes and modes of disposition reversed from those of FIG. 6. This metal mold 50, when necessary, may have the cores 55a, 55b formed integrally with the upper mold 56.

The production of sleeves are carried out by connecting a small hole 61 formed in the bottom part of the vessel 60 to the sprue 57 of the metal mold 50, applying pressure to the molten alloy A' in the vessel 60 through the medium of inert gas thereby forwarding the molten alloy A' from the small hole 61 in the bottom of the vessel 60 through the runners 53, 54a, and 54b into the cavities 52a, 52b until these cavities are filled with the molten alloy A' to capacity, and solidifying the molten alloy at a cooling rate preferably exceeding 10 K/s to obtain the sleeve made of an alloy consisting substantially of an amorphous phase.

By the procedure just described, the sleeve can be produced which manifests a dimensional accuracy, L, in the range of ±0.0005 to ±0.001 mm and a surface accuracy in the range of 0.2 to 0.4 μm.

The method, as described above, manufactures two cast products by a single process using a metal mold provided with a pair of molding cavities. Naturally, the present invention can manufacture three or more cast products by using a metal mold provided with three or more cavities therein.

Besides the alloy casting method described above, the extrusion molding is also available for the manufacture of the sleeve. Since the amorphous alloy mentioned above possesses a large supercooled liquid region ΔTx, the sleeve can be obtained in a prescribed shape by heating a material of this amorphous alloy to a temperature in the supercooled liquid region, inserting the hot material in a container retained at the same temperature, connecting this container to the metal mold provided with the cavity of the shape of a sleeve product aimed at, pressing a prescribed amount of the heated alloy into the cavity by virtue of the viscous flow of the supercooled liquid, and molding the alloy.

Now, the present invention will be described more concretely below with reference to working examples which have demonstrated the effect of the present invention specifically.

EXAMPLE 1

By using the apparatus shown in FIG. 6 and employing the production conditions of an injection temperature of 1273 K, injection speed of 1 m/s, casting pressure of 1 MPa, and loading time of 100 milliseconds, a sleeve of an amorphous alloy having a composition of $Zr_{65}Al_{10}Ni_{10}Cu_{15}$ and the shape shown in FIG. 1 and FIG. 2 with an inside diameter of 2.5 mm, an outside diameter of 3.1 mm, and a curvature radius of ridges of 0.3 mm was manufactured.

The sleeve obtained was a product having an outstanding surface smoothness faithfully reproducing the contour of the cavity of the metal mold. It was found to manifest a Young's modulus of 80 GPa, bending strength of 2,970 MPa, Vicker's hardness of 400 (DPN), and a thermal expansion coefficient, α, of $0.95 \times 10^{-5}$/K.

By the same method, a ferrule of an amorphous alloy having a capillary part and a flange part formed integrally as shown in FIG. 3 was manufactured. This ferrule was found to have a composition of $Zr_{60}Al_{15}Co_{25}Ni_{75}Cu_{15}$ and manifest a Young's modulus of 91 GPa. When each end of two optical fibers was joined to two such ferrules manufactured as described above and the two ferrules were fit into the sleeve mentioned above through the opposite ends thereof, the optical fibers could be stably connected without causing any deviation from the axial alignment of the optical fibers.

EXAMPLE 2

Various alloys including $Zr_{60}$  $Co_{25}Ni_{75}Cu_{15}$ and shown in the following table were manufactured by melting relevant component metals. They were each placed in a quartz crucible and melted thoroughly by high-frequency induction heating. The melt was injected under a gaseous pressure of 2 kgf/cmz through a slender hole formed in the lower part of the crucible into a copper casting mold provided with a cylindrical cavity, 2 mm in diameter and 30 mm in length, and kept at room temperature to obtain a rod-like specimen for the determination of mechanical properties. The results of this determination are shown in the table.

TABLE

| Alloy used | Tensile strength (MPa) | Bending strength (MPa) | α $10^{-5}$/K. (room temperature - Tg) | E (GPa) | Hardness Hv | Tg (K) | Tx (K) |
|---|---|---|---|---|---|---|---|
| $Zr_{67}Cu_{33}$ | 1,880 | 3,520 | 0.8 | 99 | 540 | 603 | 669 |
| $Zr_{65}Al_{7.5}Cu_{27.5}$ | 1,450 | 2,710 | 0.8 | 93 | 420 | 622 | 732 |
| $Zr_{65}Al_{7.5}Ni_{10}Cu_{17.5}$ | 1,480 | 2,770 | 0.9 | 92 | 430 | 630 | 736 |
| $Zr_{60}Al_{15}Co_{2.5}Ni_{7.5}Cu_{1.5}$ | 1,590 | 2,970 | 1.0 | 91 | 460 | 652 | 768 |

It is clearly noted from the table that the produced amorphous alloy materials showed such magnitudes of bending strength as notably surpass the magnitude (about 1,000 MPa) of the partially stabilized zirconia heretofore adopted as the material for the sleeve, such magnitudes of Young's modulus as approximate one half, and such magnitudes of hardness as approximate one third thereof, indicating that these alloy materials were vested with properties necessary as the material for the sleeve.

EXAMPLE 3

A metal mold of steel as illustrated in FIG. 6 and a metallic extruder were connected and a sleeve was manufactured by extruding the same alloy as used in Example 1. For the extrusion, amorphous billets, 25 mm in diameter and 40 mm in length, of the same alloy prepared separately by casting were used. The billets were preheated to 730 K and the container of the extruder and the inlet part and the molding part of the metal mold were similarly preheated to 730 K. The hot billets were inserted into the container of the extruder and then injected into the metal mold. The metal mold was cooled. Then the formed article was removed from the mold, deprived of the inlet part, and inspected. The outward appearance, the dimensional accuracy, the surface roughness, etc. of the formed article were found to be nearly equal to those of the sleeve obtained in Example 1.

While certain specific embodiments and working examples have been disclosed herein, the invention may be embodied in other specific forms without departing from the spirit or essential characteristics thereof. The described embodiments and examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A sleeve for abutting, aligning, and retaining opposed optical connector ferrules, which sleeve is made of a substantially amorphous alloy possessing at least a glass transition region and having a composition represented by the following general formula and containing an amorphous phase in a volumetric ratio of at least 50%

$$X_aM_bAl_c.$$

wherein X represents at least one element selected from the group consisting of Zr and Hf, M represents at least one element selected from the group consisting of Mn, Fe, Co, Ni, and Cu, and a, b, and c represent such atomic percentages as respectively satisfy $25 \leq a \leq 85$, $5 \leq b \leq 70$, and $0 < c \leq 35$.

2. The sleeve according to claim 1, wherein said glass transition region has a temperature width of not less than 30 K.

3. The sleeve according to claim 1, wherein said glass transition region has a temperature width of not less than 60 K.

4. The sleeve according to claim 1, wherein the sleeve is made of an amorphous alloy more susceptible of elastic deformation than the material for the optical connector ferrules.

* * * * *